G. H. VINING.
T-SLOT BAR.
APPLICATION FILED APR. 22, 1907.

931,164.  Patented Aug. 17, 1909.

Witnesses:
M. Cox
F. E. Ackley

Inventor:
George H. Vining
By F. G. Fischer atty.

UNITED STATES PATENT OFFICE.

GEORGE H. VINING, OF KANSAS CITY, MISSOURI.

T-SLOT BAR.

No. 931,164.　　　　Specification of Letters Patent.　　　　Patented Aug. 17, 1909.

Application filed April 22, 1907. Serial No. 369,560.

*To all whom it may concern:*

Be it known that I, GEORGE H. VINING, a citizen of the United States, residing at Kansas City, in the county of Jackson and State of Missouri, have invented a new and useful T-Slot Bar, of which the following is a specification.

My invention relates to a new and useful article of manufacture; and my object is to supply the trade with T-slots of any desired configuration in cross-section, at much lower cost than they can be cut with the machinery now employed for this purpose.

One of the most difficult and expensive jobs encountered in machine-shop practice is that of cutting T-slots and the difficulties increase with the length and smallness of the slot. For instance, if a long slot is desired a proportionate length of time is required to cut it, and if the slot be small in cross-section it is difficult to obtain a cutter of sufficient strength to enter the narrow confines of said slot and cut away the material as it advances.

My invention permits of placing T-slots of any desired length, width, or configuration upon the market at small cost, so that the tedious work and expense now involved in cutting out these slots may be avoided.

In order that the invention may be fully understood, reference will now be made to the accompanying drawing, in which:—

Figure 1:
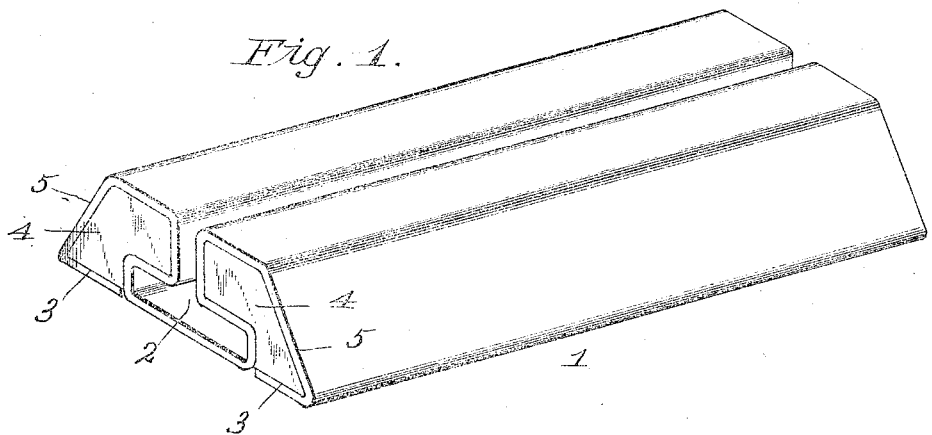
Figure 2:
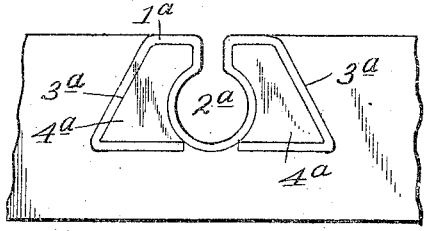
Figure 3:
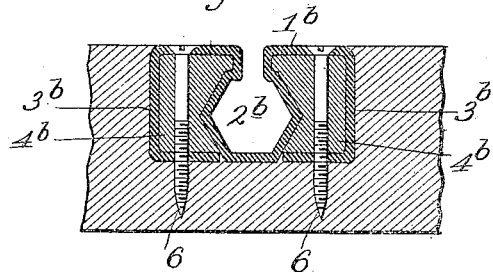
Figure 4:
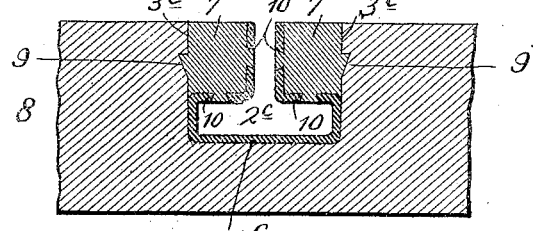

Figure 1 represents a perspective view of the preferred form of my T-slot bar. Fig. 2 is an end view of a modified form of the T-slot bar in position in the table of a machine. Figs. 3 and 4 are cross-sections of modified forms in operative positions.

In carrying out the invention I employ a shell 1, consisting preferably of sheet metal which is bent in the form of a T-slot 2 and a pair of pockets 3, which latter are contiguous to the former so that the walls of the pockets will reinforce the walls of the slot. The walls of the slot are further reinforced, when desired, by filling the pockets with suitable material 4, which material consists preferably of metal poured into the pockets while in a liquid state. The article is preferably made in a long bar which can be cut into suitable lengths as required, and sold over the counters of machine-supply houses, hardware stores, etc. The outer side walls 5 of the shell are preferably arranged to slope inwardly and upwardly so that the bar may be driven friction-tight into a dove-tail groove, as shown in Fig. 2, and thus avoid the necessity of employing extraneous fastening devices to secure it in an operative position, but as it is easier to cut a groove with vertical sides I provide the forms shown in Figs. 3 and 4, which may be secured in an operative position by screws 6, or strips 7.

Referring in detail to Fig. 2, $1^a$ designates the shell formed into a circular T-slot $2^a$ and pockets $3^a$, which latter are filled with reinforcing material $4^a$.

In the modified form Fig. 3, $1^b$ designates the shell formed into a hexagonal T-slot $2^b$ and pockets $3^b$, which latter are filled with reinforcing material $4^b$.

The modified form Fig. 4, represents the shell $1^c$ formed into the customary T-slot $2^c$. Two pockets $3^c$ are left between the upper walls of the slot, and a table 8, containing the article, for the reception of strips 7 whereby the article is held in place on the table. Strips 7 preferably consist of metal poured into the pockets while in a liquid state, the pockets being provided with notches 9 for the metal to flow into so that when it congeals it will be reliably secured to the table. For like reasons opening 10 will be left in the upper walls of the slot.

My T-slot bar may be applied to a wide range of machines and mechanical devices constructed of metal or wood, such for instance, as milling machines, planers, lathe-carriages, drill-presses, etc.

Having thus described my invention, what I claim is:—

1. A device of the character described, consisting of a shell arranged in the form of a T-slot, and a pocket contiguous to said slot, the walls of the pocket being arranged to reinforce the walls of the slot.

2. A device of the character described, consisting of a shell arranged in the form of a T-slot and pockets contiguous to said slot, and means in said pockets for reinforcing the shell.

3. A device of the character described, consisting of a shell arranged in the form of a T-slot, and exterior reinforcing means for stiffening the walls of said T-slot.

4. A device of the character described, consisting of a shell arranged in the form of a T-slot and pockets contiguous to the sides of the T-slot, the sides of said pockets sloping inwardly and upwardly to enter a dovetailed groove.

In testimony whereof I affix my signature, in the presence of two witnesses.

G. H. VINING.

Witnesses:
F. G. FISCHER,
M. COX.